(12) United States Patent
Balasubramanyan (10) Patent No.: US 12,251,994 B1
(45) Date of Patent: Mar. 18, 2025

(54) AUTOMOTIVE GLARE REDUCTION SYSTEM

(71) Applicant: Ramesh Balasubramanyan, Salem, OR (US)

(72) Inventor: Ramesh Balasubramanyan, Salem, OR (US)

( * ) Notice: Subject to any disclaimer, the term of this patent is extended or adjusted under 35 U.S.C. 154(b) by 673 days.

(21) Appl. No.: 17/384,112

(22) Filed: Jul. 23, 2021

Related U.S. Application Data (60) Provisional application No. 63/060,049, filed on Aug. 1, 2020.

(51) Int. Cl.
*B60J 3/04* (2006.01)
*G06V 20/58* (2022.01)
*G06V 40/18* (2022.01)

(52) U.S. Cl.
CPC .............. *B60J 3/04* (2013.01); *G06V 20/584* (2022.01); *G06V 40/18* (2022.01)

(58) Field of Classification Search
CPC .......... G06V 20/584; G06V 40/18; B60J 3/04
USPC ........................................................ 359/275
See application file for complete search history.

(56) References Cited

U.S. PATENT DOCUMENTS

| | | |
|---|---|---|
| 2,755,700 A | 7/1956 | Gunnar |
| 4,874,195 A | 10/1989 | Lu et al. |
| 5,158,334 A | 10/1992 | Felland |
| 6,693,746 B1 | 2/2004 | Nakamura et al. |
| 10,744,936 B1 * | 8/2020 | Budhia ............... B60J 3/04 |
| 2018/0015811 A1 * | 1/2018 | Kim ............... G02F 1/0121 |
| 2018/0376052 A1 * | 12/2018 | Ardö ............... H04N 23/667 |

FOREIGN PATENT DOCUMENTS

JP 2015099556 A * 5/2015

\* cited by examiner

*Primary Examiner* — William Choi
(74) *Attorney, Agent, or Firm* — Rylander & Associates, PC; Philip R. M. Hunt (57) ABSTRACT

A system for reducing glare experienced by a driver. The system includes a camera and a processor mounted on a vehicle and a display screen mounted on a windshield of the vehicle. The processor captures an image from the camera, detecting one or more headlights within the image using one or more Haar-Cascade classifiers and determining current measured positions of the headlights within the image. The processor is further configured for determining a location of one or more blots on the display screen, based on setup locations of the blots, Kalman filter predicted positions of the headlights within the image updated with the current measured positions. The processor is configured for sending commands to put pixels in the blots on the display screen into a low transparency state. The system includes controls configured for sending control signals for changing the setup location of the blots.

12 Claims, 6 Drawing Sheets

AUTOMOTIVE GLARE REDUCTION SYSTEM

CROSS-REFERENCE TO RELATED APPLICATIONS

This application claims the benefit of U.S. Provisional Application No. 63/060,049, filed 2020 Aug. 1.

TECHNICAL FIELD

This specification describes systems, devices and/or methods related to automotive safety. More particularly, the present specification describes systems, devices and/or methods related to glare reduction for automobiles.

BACKGROUND

The national safety council states that even though we do only 25% of our driving at night, 50% of all traffic deaths happen during that time. In a 2007 report to Congress by the NHTSA (National Highway Traffic and Safety Administration) stated that "Glare reduces seeing distance because it causes light scatter in the eyes, which in turn reduces the contrast of roadway objects."

Other systems have been devised for glare reduction, but typically rely on complex methods to track the current location of the automobile driver's eyes. However, these prior art glare reduction systems typically fail as the driver will usually move his/her head to compensate if the system places a glare reduction spot on the wrong location in the windshield of the automobile so the spot is not directly in line of sight between the driver's eyes and the on-coming headlights. What is needed is a system that reduces the glare from on-coming headlights without such tracking of the driver's eyes.

BRIEF DESCRIPTION OF THE DRAWINGS

The accompanying drawings, which are incorporated into and constitute a part of this specification, illustrate one or more embodiments of the inventive subject matter and, together with the detailed description, serve to explain the principles and implementations thereof. Like reference numbers and characters are used to designate identical, corresponding, or similar components in different figures. The figures associated with this disclosure typically are not drawn with dimensional accuracy to scale, i.e., such drawings have been drafted with a focus on clarity of viewing and understanding rather than dimensional accuracy.

DETAILED DESCRIPTION

In describing the one or more representative embodiments of the inventive subject matter, use of directional terms such as "upper," "lower," "above," "below", "in front of," "behind," etc., unless otherwise stated, are intended to describe the locations and/or orientations of various components relative to one another as shown in the various Figures and are not intended to impose limitations on any location and/or orientation of any component relative to any reference point external to the Figures.

In the interest of clarity, not all of the routine features of representative embodiments of the inventive subject matter described herein are shown and described. It will, of course, be appreciated that in the development of any such actual implementation, numerous implementation-specific decisions must be made in order to achieve specific goals, such as compliance with application and business related constraints, and that these specific goals will vary from one implementation to another and from one developer to another. Those skilled in the art will recognize that numerous modifications and changes may be made to the representative embodiment(s) without departing from the scope of the claims. It will, of course, be understood that modifications of the representative embodiments will be apparent to those skilled in the art, some being apparent only after study, others being matters of routine mechanical, chemical and electronic design. No single feature, function or property of the representative embodiments is essential. In addition to the embodiments described, other embodiments of the inventive subject matter are possible, their specific designs depending upon the particular application. Any embodiment described as "comprising" includes the case of "consisting only of." The scope of the inventive subject matter should not be limited by the particular embodiments herein described but should be defined only by the appended claims and equivalents thereof.

First Representative Embodiment—Structure

Figure 1:
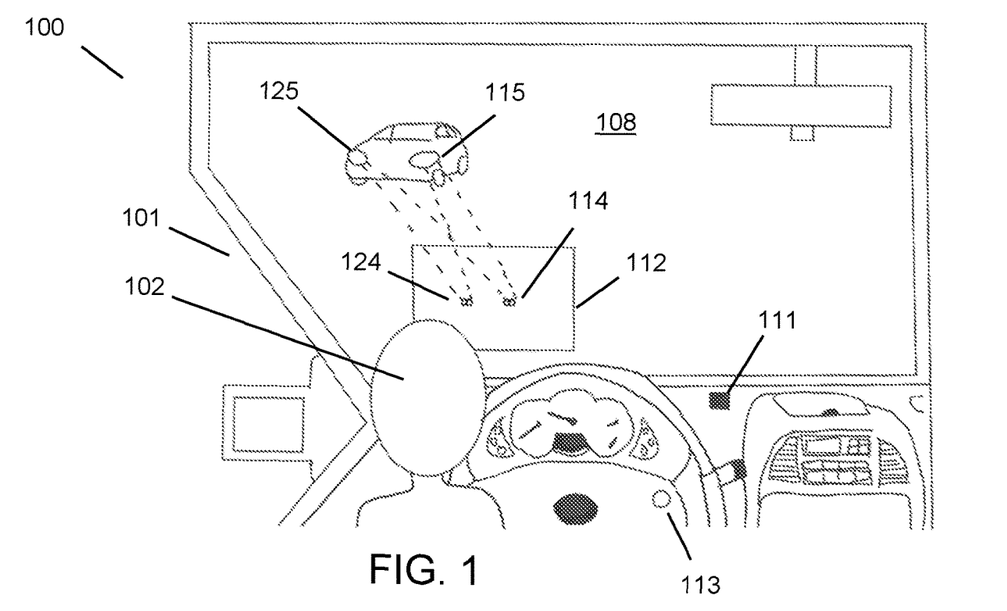
FIG. 1 shows a representative embodiment automotive glare reduction system 100 for an automobile 101 from a point of view behind the driver looking forward.
Figure 2:
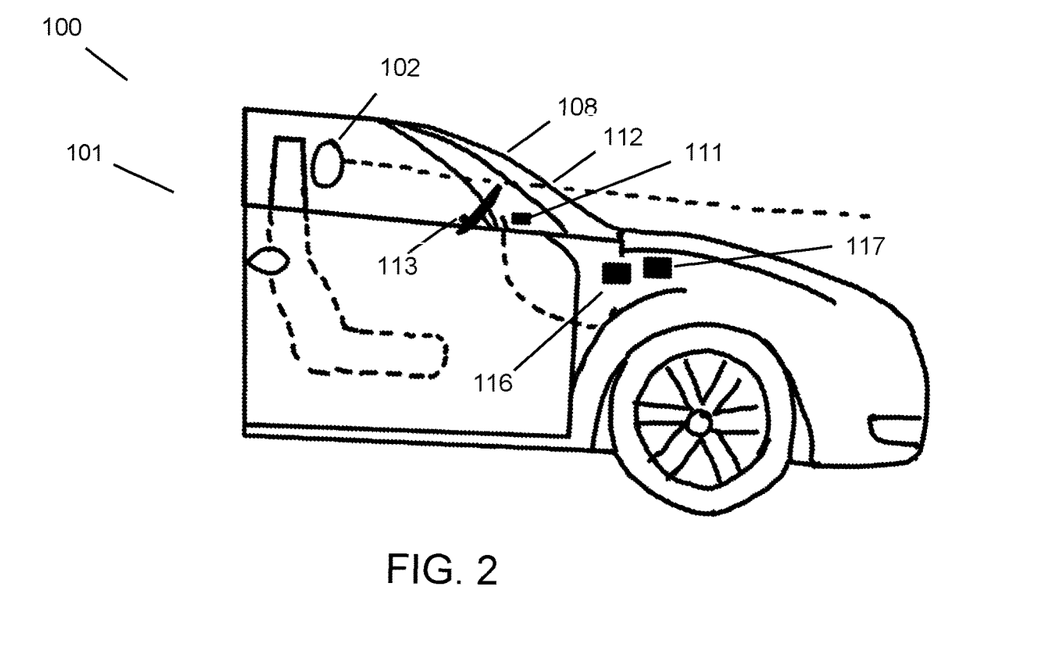
FIG. 2 shows a side view of the representative embodiment automotive glare reduction system 100.

FIG. 1 shows a first representative embodiment automotive glare reduction system 100 for an automobile 101 from a point of view behind the driver looking forward. FIG. 2 shows a side view of the representative embodiment automotive glare reduction system 100. The representative embodiment automotive glare reduction system 100 comprises a camera 111, blot adjustment controls 113, processor 116, a transparent display screen 112 and a display screen driver 117. The representative embodiment automotive glare reduction system 100 reduces the brightness associated with one or more headlights 115, 125 of an oncoming vehicle, allowing better visibility for the driver 102.

The camera 111 is mounted in a convenient location on the automobile 101, typically on the dashboard. The camera 111 is oriented to point towards oncoming traffic. The camera 111 is configured to capture and send a real-time video signal to the processor 116. The video signal comprises a series of video image frames.

The transparent display screen 112 in the representative embodiment automotive glare reduction system 100 is an Organic LED (OLED) display screen that is transparent and flexible. However, in other embodiments, the transparent display screen 112 may utilize other suitable technologies other than OLED. The transparent display screen 112 comprises a plurality of pixels, arranged in a grid or other suitable pattern. The transparent display screen 112 is configured to change the transparency of individual pixels based on signals from the display screen driver 117. In the representative embodiment automotive glare reduction system 100, the transparent display screen 112 is configured to change the transparency of individual pixels through a range from transparent to opaque. In other embodiments, the individual pixels only change from a transparent state to an opaque state. In some embodiments, the transparent display screen 112 changes the color or shade of individual pixels. During normal operation, almost all of the pixels of the transparent display screen 112 are in transparent or substantially transparent states. One or more blots 114, 124 are put on the transparent display screen 112 to reduce the glare of the headlights 115, 125 of oncoming vehicles by changing the state of select pixels.

In the representative embodiment automotive glare reduction system 100, the blots 114, 124 are produced by making the pixels less transparent within the area to be blotted, but not completely opaque. This allows some of the light of the headlights 115, 125 of oncoming vehicles to pass through and be seen by the driver 102, but with less intensity and glare. In other embodiments, the blots 114, 124 are produced by turning opaque some of the pixels within the area to be blotted while leaving transparent some distributed portion of the pixels within area to be blotted. This too allows some of the light of the headlights 115, 125 of oncoming vehicles to pass though and be seen by the driver 102, but with less intensity and glare. In other embodiments, the blots 114, 124 are produced by turning opaque all of the pixels within the area to be blotted, but projecting light of a similar color from at least some of the pixels within the blots 114, 124 to make simulated headlights that will allow the driver 102 to track the location of the oncoming vehicle. Typically, a right blot 114 blocks light from the headlights 115, 125 to the right eye 106 of the driver 102 and a left blot 124 blocks light from the headlights 115, 125 to the left eye 126 of the driver 102. The blots 114, 124 are typically elongated horizontally to account for the 2 headlights seen by each of the eyes 106, 126. The blots 114, 124 are spaced horizontally to account for the spacing between the eyes 106, 126. In other embodiments, a single large blot blocks light from the headlights 115, 125 to both the right eye 106 and the left eye 126.

The transparent display screen 112 is coupled to the windshield 108. In the representative embodiment automotive glare reduction system 100, the transparent display screen 112 is coupled to the windshield 108 using surface tension, so that the driver 102 may attach it and remove it easily. In other embodiments, the transparent display screen 112 is coupled to the windshield 108 with some other suitable mechanism, such as adhesive or brackets. The transparent display screen 112 is sized, shaped and positioned on the windshield 108 such that it will intersect a the line of sight between one of the eyes 106, 126 of the driver 102 and the headlights 115, 125 of oncoming vehicles as they approach and pass the automobile 101. In the representative embodiment automotive glare reduction system 100 the transparent display screen 112 is rectangular and has a height at least ⅓ the height of the windshield 108, but in other embodiments may have other suitable shapes and dimensions.

Figure 3:
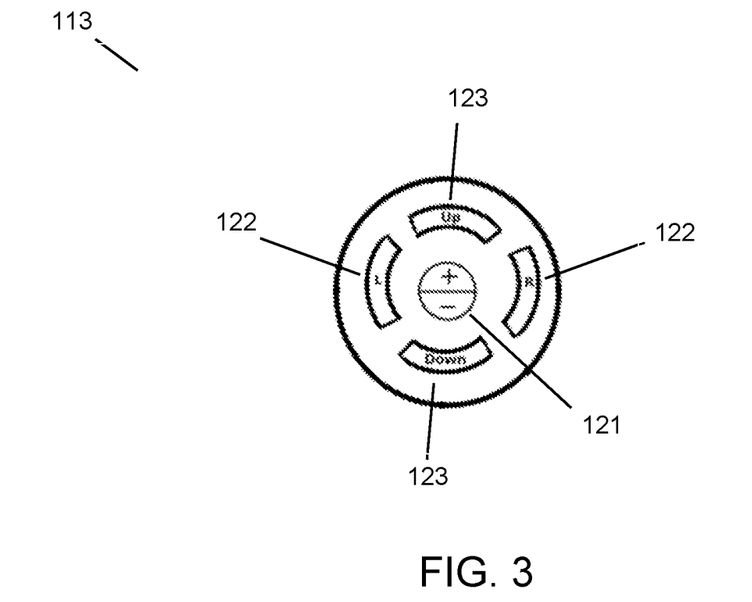
FIG. 3 shows a close up view of the blot adjustment controls 113 for the representative embodiment automotive glare reduction system 100.

FIG. 3 shows a close up view of the blot adjustment controls 113 for the representative embodiment automotive glare reduction system 100. The blot adjustment controls 113 include intensity controls 121, left/right controls 122, and up/down controls 123. The blot adjustment controls 113 are configured to send adjustment signals to the processor 116 to adjust the locations and intensity of the blots 114, 124 on the transparent display screen 112. In the representative embodiment automotive glare reduction system 100 the blot adjustment controls 113 are a pattern of push buttons located on the steering wheel in a location where the driver 102 can operate with his/her thumbs. In other embodiments, the blot adjustment controls 113 may be positioned in a different location and may employ a different mechanism such as a joystick. The intensity controls 121 are configured to send a signal to the processor 116 that an intensity threshold should be increased or decreased. The intensity threshold used by the processor 116 to determine when to begin the process of blotting light through the transparent display screen 112 of the headlights 115, 125 of an oncoming vehicle. The left/right controls 122 are configured to send a signal to the processor 116 that the blots 114, 124 should be moved left or right on the transparent display screen 112. The up/down controls 123 are configured to send a signal to the processor 116 that the blots 114, 124 should be moved up or down on the transparent display screen 112. In some embodiments, the blots 114, 124 may be controlled individually.

In some embodiments, there are additional controls configured to send a signal to the processor 116 that the pixilation of the blots 114, 124 should be increased or decreased. In some embodiments, there are additional controls configured to send a signal to the processor 116 that the size of the blots 114, 124 should be increased or decreased. In some embodiments, there are additional controls configured to send a signal to the processor 116 that the shape of the blots 114, 124 should be changed to a different shape. In some embodiments, there are additional controls configured to send a signal to the processor 116 that the distance between the blots 114, 124 should be increased or decreased.

Figure 4:
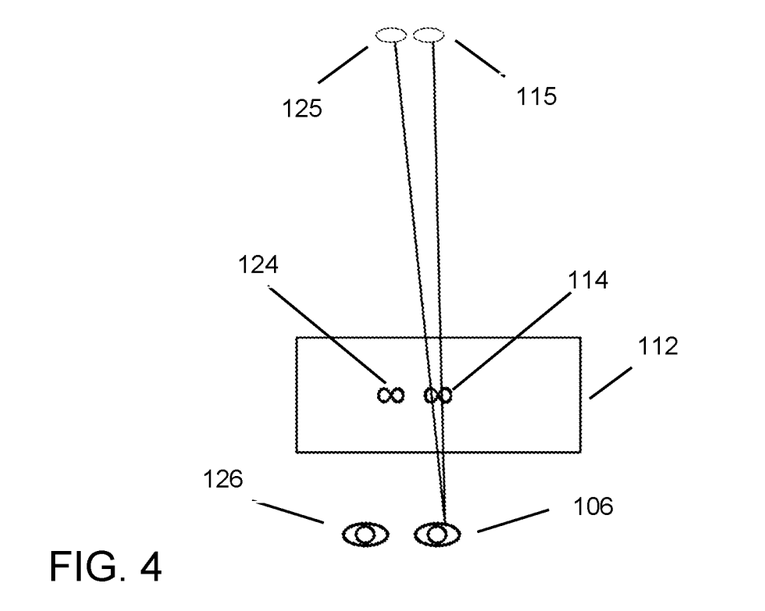
FIG. 4 shows blots 114, 124 on the display screen 112 in locations calculated to intersect the line of sight between the eyes 106, 126 of the driver and the headlights 115, 125 of an oncoming vehicle.

The processor 116 is configured to receive the video signal, capture a video frame image from the video signal, analyze the video frame image to detect headlights 115, 125 in the video frame image, determine the coordinates (x, y) of the headlights 115, 125 within the video frame image, send commands to the display screen driver 117 to put one or more blots 114, 124 on the display screen 112 in locations calculated to intersect the line of sight between one of the eyes 106, 126 of the driver 102 and the headlights 115, 125 (See FIG. 4) based the coordinates of the headlights 115, 125 within the video frame image and a current set of setup information.

The processor 116 may be a single processor or a main process or with a plurality of sub-processors, in the same package or distributed in a plurality of packages. In the representative embodiment automotive glare reduction system 100, the processor 116 has a Graphic Processing Unit (GPU) that runs OpenCV (Open Computer vision custom Python program) that is used to process the video signal and video frame images, but in other embodiments may process them in a main processor of the processor 116.

Haar-Cascade Classifier—Training the Model to Detect Headlights

One of the key features of the representative embodiment automotive glare reduction system 100 is the quick and accurate detection of headlights in the video frame image. A typical image captured at night is filled with additional light sources besides the headlights of oncoming vehicles such as streetlights, porch lights traffic lights and shop signs etc.

In order to correctly detect only the headlights of oncoming cars, a machine learning algorithm called Haar-Cascade is used to train a "Classifier" by using thousands of positive images containing headlights and negative images that do not contain headlights in them. The Haar-Cascade classifier is ideally suited for this application due to its ability to rapidly detect a particular image In order to develop the Haar-Cascade classifier, a library of thousands of positive images is built by collecting videos of headlights from passing cars. From these videos, images are extracted ranging in size from 22×22 pixels (distant image of headlights) to 204×204 pixels (close-up image of headlights). Another related library has a few thousand positive images of single headlights. This second set of images is used to train a classifier that is used to detect single headlights within the area of the original image where the dual headlights are detected. The Haar-Cascade classifiers are created using OpenCV (Open computer vision) libraries in Python. Many of the Haar-Cascade algorithm parameters were tweaked for this application in order to ensure reliable detection of headlights in an image, specifically the OpenCV "scale factor" and "min neighbors" parameters.

Kalman Filter—Predicting Headlight Positions

The representative embodiment automotive glare reduction system 100 uses a Kalman filter with a regressive prediction formula to predict the future position of headlights within a video frame image. This provides improved performance over systems that purely compute the current position of the headlights based on the measured position of the oncoming headlights. The Kalman filter is an algorithm that is used in statistics to solve time series problems when data being read by the system has errors. In situations where the Kalman filter is used, there is usually a formula that can be used to predict the variable in question such as the position of an airplane being tracked in the air or a projectile falling from the sky. The Kalman filter, by virtue of the Kalman gain, gauges how much importance to give the estimated value versus the measured value. If the K the Kalman gain is high (closer to 1), more weight is given to the measured value. If the Kalman gain is low, more weight is given to the predicted value. The responsiveness of the Kalman filter can be measured by the Kalman gain. A high gain close to one will result in a jumpier estimated trajectory, while a low gain close to zero will smooth out noise but decrease the responsiveness. In the representative embodiment automotive glare reduction system 100, the positions (coordinates) of the headlights in the $x_1$ and $x_2$ directions ($x_1$ orthogonal to $x_2$) are each analyzed separately with a Kalman filter. In other embodiments, they may be analyzed at the same time using larger dimension matrices.

For prediction of the position and velocity of the headlight in the x direction within the video frame image, the following state estimate predictor equation is used:

$$X_{k|k-1}=AX_{k-1|k-1}+Bu_k+w_k$$

Where X is a 2×1 state estimate matrix with values $[x_1, x_1']_k$ representing estimated values of the position and velocity of the headlights in the $x_1$ direction within the video frame image.

Where $X_{k|k-1}$ represents the current predicted state estimate at time step k (updated with the k−1 measurement).

Where $X_{k-1|k-1}$ represents the prior updated state estimate at time step k−1 (updated with the k−1 measurement).

Where A is a 2×2 state transition matrix having the following values: [1 ΔT, 0 1] where ΔT is elapsed time since last observation.

Where B is a 2×1 control matrix that accounts for any acceleration of the headlights. In the first representative embodiment the control matrix B the following values: [0 0].

Where $u_k$ is a 1×1 input variable matrix at time step k with a single element $[x_1'']_k$ representing estimated acceleration of the headlights in the x direction within the video frame image.

Where w is a 2×1 process noise covariance matrix. In the first representative embodiment, the process noise covariance matrix w has the following values: [0, 0].

On the initial iteration, an initial estimate $X_0$ of the position and velocity of the headlights in the x direction within the video frame image is predetermined provided from stored memory.

A prediction of the error (covariance) in the Kalman process is made using an error estimate prediction equation:

$$P_{k|k-1}=AP_{k-1|k-1}A^T+Q_k$$

Where P is a 2×2 error estimate matrix, representing error in the state estimate.

Where $P_{k|k-1}$ is the current predicted error (covariance) estimate.

Where $P_{k-1|k-1}$ is the prior updated error (covariance) estimate.

Where $Q_k$ is a 2×2 process error (covariance) matrix, based on experimental data of process noise provided by the manufacturer of the system.

On the initial iteration, an initial error estimate $P_0$ is predetermined and provided from stored memory.

The same state estimate predictor equation and the same error estimate prediction equation are used with to determine estimated position and estimated velocity in the $x_2$ direction as well as current predicted error of the estimated position and estimated velocity.

The $k^{th}$ measurement is taken later during the $k^{th}$ time step. A new video frame image is captured. A measurement of the position (coordinates) of the headlights in the x direction within the video frame image are made by the Haar-Cascade detect function and stored in the measurement matrix $Z_k$ as element $z_1$. Velocity $z_{1,k}'$ of the headlights in the $x_1$ direction is calculated based on the difference between current predicted position $x_{1,k|k-1}$ and prior predicted position $x_{1,k-1|k-1}$, divided by change in time ΔT and stored in the measurement matrix $Z_k$. Measurement matrix $Z_k$ is a 2×1 matrix with elements $[z_1, z_1']_k$. Acceleration of the headlights $x_k''$ in the $x_1$ direction may be calculated based on the difference between current predicted velocity $x_k'$ and past predicted velocity $x_{k-1}'$, divided by change in time ΔT and stored in the input variable matrix $u_k$. However, in the representative embodiment automotive glare reduction system 100, acceleration is not used, the control matrix B is all zeros, and acceleration is not calculated. The position of the headlights in the $x_2$ direction are measured and the velocity in the $x_2$ direction is calculated in the same way as that used for the $x_1$ direction. In some embodiments, acceleration in the $x_2$ direction is calculated as well.

The Kalman gain $K_k$ a 2×2 matrix calculated as a ratio of:

Error in estimated position of headlight/(Error in estimated position of headlight+Error in measured position of headlight)

Using a Kalman gain equation:

$$K_k=P_{k|k-1}H^T/(HP_{k|k-1}H^T+R_k)$$

Where H is a 2×2 observation matrix with values of [1 0, 0 1].

Where $R_k$ is a 2×2 observation error matrix, based on experimental data of measurement noise provided by the manufacturer of the system.

Next, the state estimate $X_k$ (i.e. position and velocity) of the headlight is updated with the measurement matrix $Z_k$ using a state estimate update equation:

$$X_{k|k} = X_{k|k-1} + K_k(Z_k - HX_{k|k-1})$$

Where $X_{k|k-1}$ is the current predicted state estimate at time step k (updated with the k-1 measurement).

Where $X_{k|k}$ is the current updated state estimate at time step k (updated with the $k^{th}$ measurement).

The error estimate matrix P is updated as well with an error estimate update equation:

$$P_{k|k} = (I - K_k H) P_{k|k-1}$$

Where $P_{k|k}$ is the current updated error (covariance) estimate.

Where $P_{k|k-1}$ is the current predicted error (covariance) estimate.

The same Kalman gain equation, state estimate update equation, and estimate error prediction equation are used to determine the current updated estimate of the position and velocity in the $x_2$ direction as well as the current updated error estimate.

After a time ΔT has passed, the state is advanced to the next time step (k=k+1). Further iterations can be performed by looping back to the predictor equation calculation of new predicted positions and velocity.

For the implementation of the Kalman filter in this application, computing the acceleration of the tracked headlight is complicated by curvature of the road and hence the path taken by the headlight. To improve tracking of the headlight, the control variable matrix $u_k$ is not used, instead velocity of the tracked headlight is constantly computed by referring to 'n' previous predicted readings. This constant adjustment of velocity rather than using a static formula provides a better prediction of the position of the headlights in the video frame image.

First Representative Embodiment—Operation

When the representative embodiment automotive glare reduction system 100 switches on, it will first go through a setup phase of operation to obtain a current set of setup information before starting a normal phase of operation. This setup phase eliminates the need to track the exact location and orientation of the driver's head and eyes in order to dim oncoming headlights while driving. The processor 116 retrieves a previous set of setup information generated in a previous setup phase (if any) or if a previous set is not available, using a default set of setup information as the previous set of setup information. The processor 116 then causes one or more blots 114, 124 to be put on the display screen 112 in setup locations based on the retrieved setup information, in the representative embodiment automotive glare reduction system 100. Typically, a right blot 114 is displayed to block light from the headlights 115, 125 to the right eye 106 of the driver 102 and a left blot 124 is displayed to block light from the headlights 115, 125 to the left eye 126 of the driver 102. If using a default set of setup information, the processor 116 will place the blots 114, 124 in default setup locations on the transparent display screen 112 where light from headlights 115, 125 of an oncoming vehicle in the distance on a straight road will first be seen by a driver 102 of average height (specifically, average height of eye). If the driver 102 is not of average height, then the blots 114, 124 will appear to be too high or too low to that driver 102. If the driver 102 tends to sit shifted to the left or right compared to the typical driver, the blots 114, 124 will need to be adjusted left or right accordingly.

The driver 102 then uses the left/right controls 122 and the up/down controls 123 to send control signals to the processor 116 to change the current setup location of the blots 114, 124 to a location on the transparent display screen 112 where the driver 102 anticipates that he/she will first detect the headlights 115, 125 from an oncoming vehicle on a straight road. The driver 102 can do this from memory-remembering from when he/she last drove. If the transparent display screen 112 had been installed or relocated since the last time the driver 102 observed, the driver 102 will have to remember the location on the windshield 108 behind (from the driver's perspective) the transparent display screen 112 and transpose it to the equivalent location on the transparent display screen 112. Alternatively, the driver 102 can park his/her automobile 101 on the shoulder of a road and use real oncoming vehicles to adjust the setup location of the blots 114, 124. The parallax error from being on the shoulder of the road rather than the driving lane will be small and can be ignored or the driver can make a small adjustment of the location of the blots 114, 124 to compensate.

In some embodiments, multiple sets of setup information may be stored, enabling different sets of setup information for different drivers. The driver 102 is presented with the sets of setup information available and given an opportunity to select one of them as the current setup information.

Once the processor 116 has detected that the driver 102 has the blots 114, 124 positioned to his/her satisfaction, the processor 116 stores the current setup information, including the current setup locations of the blots 114, 124, exits the setup phase and enters a normal operation stage. The processor 116 may detect that the driver 102 has the blots 114, 124 positioned to his/her satisfaction by receiving an active signal from the driver, such as the driver pushing a combination of the previously described blot adjustment controls 113 or the driver 102 pushing an additional button dedicated for that purpose. Alternatively, the processor 116 may detect that the driver 102 has the blots 114, 124 positioned to his/her satisfaction by observing that a length of time has passed with no further input from the driver 102.

Figure 5:
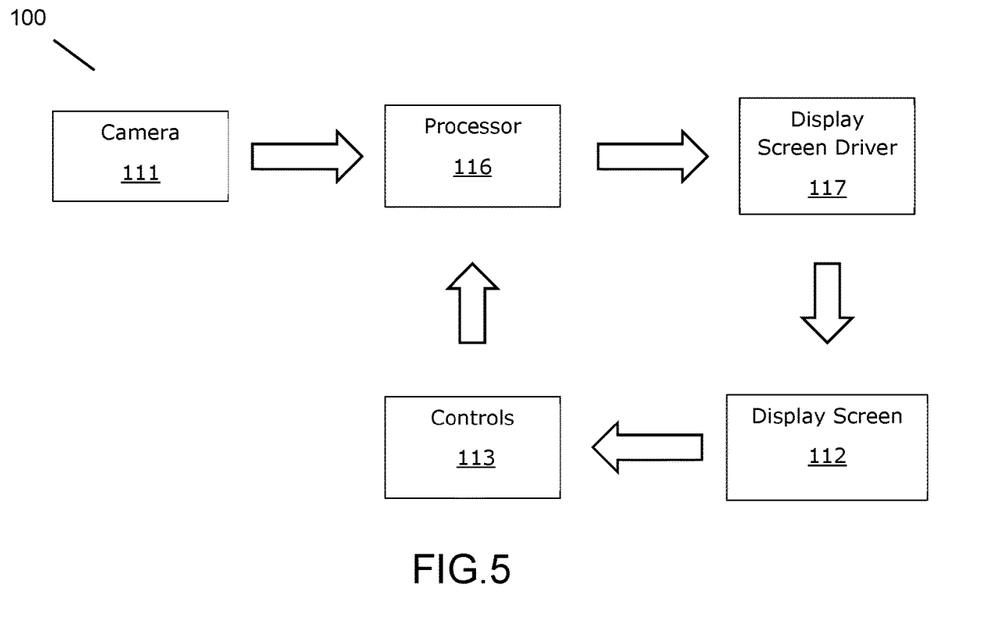
FIG. 5 shows a flow diagram of the representative embodiment automotive glare reduction system 100 during a normal phase of operation.
Figure 6:
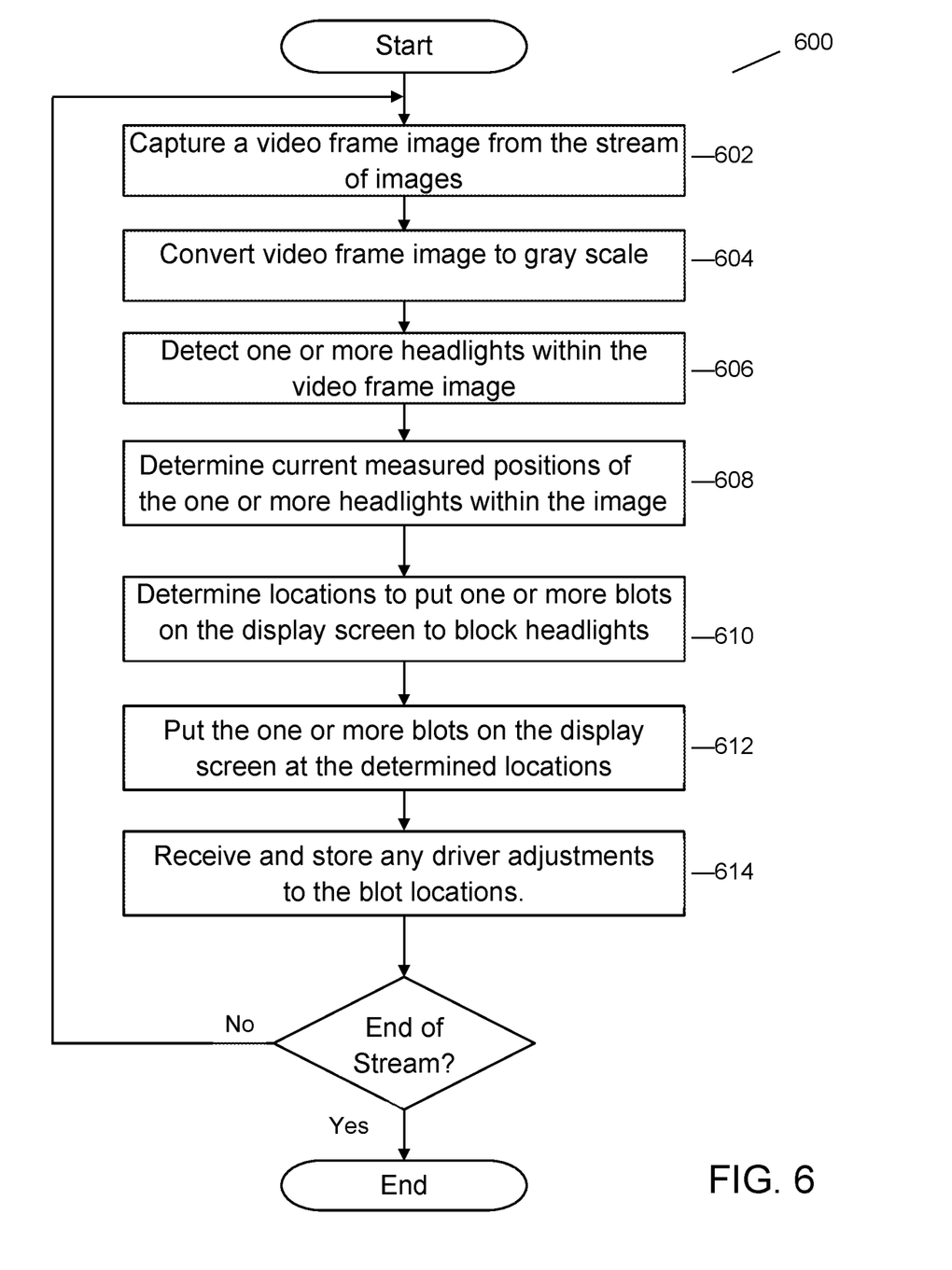
FIG. 6 shows a flow chart with an overview of the normal operating phase method 500.

FIG. 5 shows a flow diagram of the representative embodiment automotive glare reduction system 100 during a normal phase of operation. FIG. 6 shows a flow chart with an overview of the normal operating phase method 500. The camera 111 captures a real-time video signal comprising a series of video image frames. The camera 111 sends the video signal to the processor 116. The processor 116 receives the video signal and captures a video frame image from the video signal (step 602). The processor 116 converts the video frame image to gray scale (step 604). The processor 116 then analyzes the video frame image to detect headlights 115, 125 in the video frame (step 606) and determines the location of the headlights 115, 125 within the video frame image (step 608). The processor 116 determines whether the light coming from the headlights 115, 125 is too bright by comparing with an intensity threshold, part of the current setup information. If so, the processor 116 takes further action to dim the headlights 115, 125.

To dim the headlights 115, 125, the processor 116 calculates the location on the transparent display screen 112 for the blots 114, 124 that will intersect the line of sight between the eyes 106, 126 of the driver 102 and the headlights 115, 125 as well as the size and shape of the blots 114, 124 based the determined location of the headlights 115, 125 relative to the automobile 101 and the current setup information (step 610). In the representative embodiment automotive glare reduction system 100, calculating the location on the transparent display screen 112 to put the blots 114, 124 is further based on a motion prediction method that predicts the motion of the headlights 115, 125. This motion prediction method will help ensure that the blots 114, 124 are not lagging behind where they need to be due to processing delays, but other embodiments may omit this method. The processor 116 then sends commands to the display screen driver 117 to put the one or more blots 114, 124 on the display screen 112 in locations calculated (step 612). The display screen driver 117 carries out these commands and puts the blots 114, 124 on the display screen 112 in locations calculated.

If the driver 102 finds the blots 114, 124 put onto the transparent display screen 112 are not in the locations to effectively dim the headlights 115, 125 of an oncoming vehicle, the driver 102 can send adjustment signals (up/down/left/right) to the processor 116 via the left/right controls 122 and up/down controls 123. The processor 116 stores these adjustments in the current setup information and uses them in the calculation of future locations of the blots 114, 124 (step 614). Also, if the driver 102 finds that the representative embodiment automotive glare reduction system 100 begins blotting/dimming the headlights 115, 125 of oncoming vehicles too soon when they are too dim or too late when they are too bright, the driver 102 can send adjustment signals (plus/minus intensity) to the processor 116 via the intensity controls 121. The processor 116 use these adjustment signals to change the intensity threshold in the current setup information.

Figure 7:
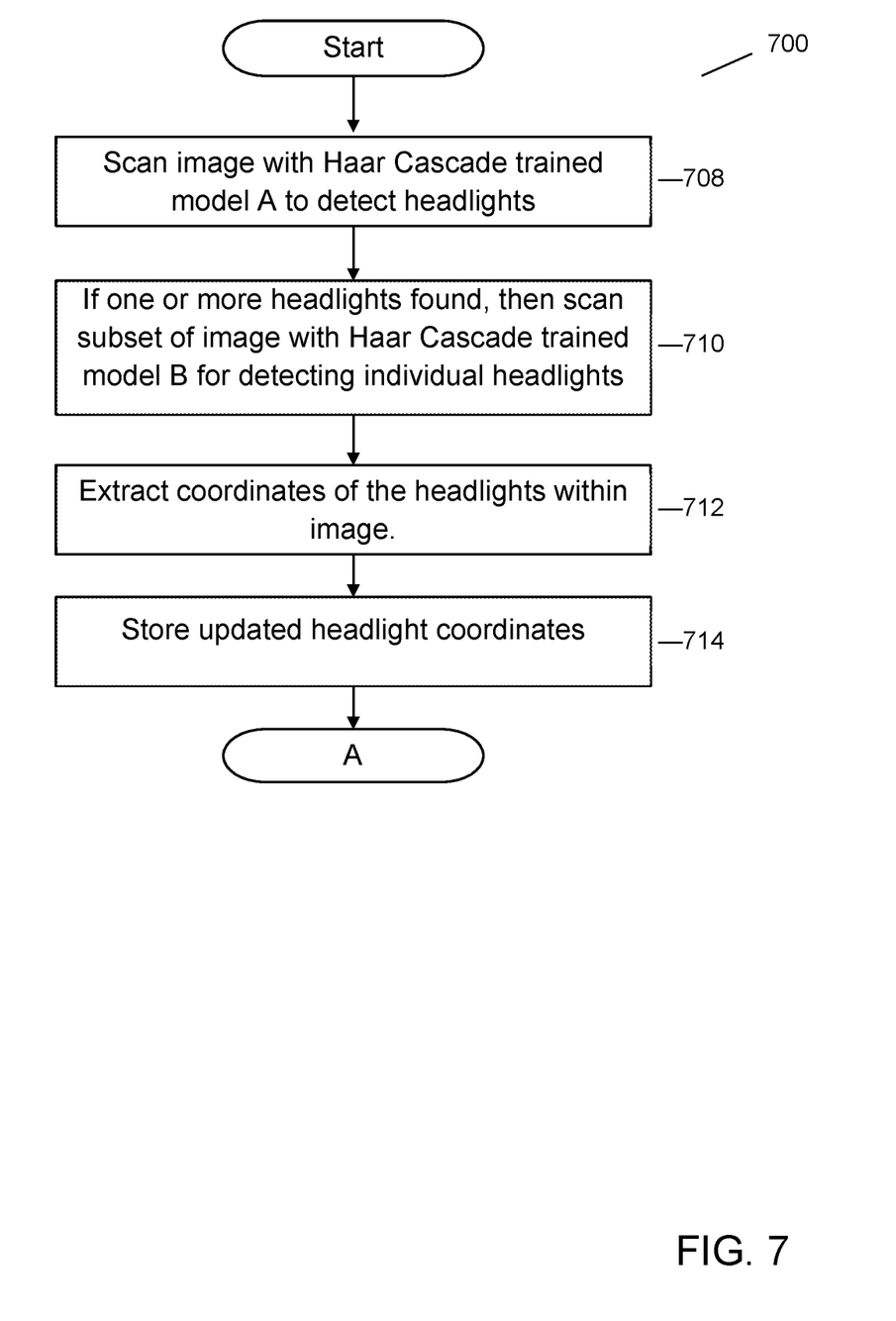
FIG. 7 is a flow chart of the classifier method 700 to determine current measured positions of the one or more headlights within a video frame image.

The video signal is captured (step 602) and split into a stream of video frame images including which are then converted to gray scale (step 604) to allow scanning by a series of Haar-Cascade classifiers. FIG. 7 is a flow chart of the classifier method 700 to determine current measured positions of the one or more headlights within the video frame image. FIG. 7 covers in detail steps 506 and 508 of FIG. 6. The first classifier (trained Model A) detects a set of one or more headlights in a first video frame image and filters out unnecessary lights (e.g. from streetlights, traffic lights, etc.) and returns coordinates of the set of headlights within the video frame image (steps 608, 708). The coordinates of the set of headlights are used to extract a subset image of the first video frame image which are passed to a second classifier (trained Model B). The second classifier (trained Model B) determines the positions of individual headlights of the set of one or more headlights within the subset image returned by first classifier (step 710). This cascading use of both models ensures high accuracy in detecting and locating headlights. The coordinates of the one or more headlights are obtained (step 712) by the second classifier (trained Model B) and stored (step 714).

Figure 8:
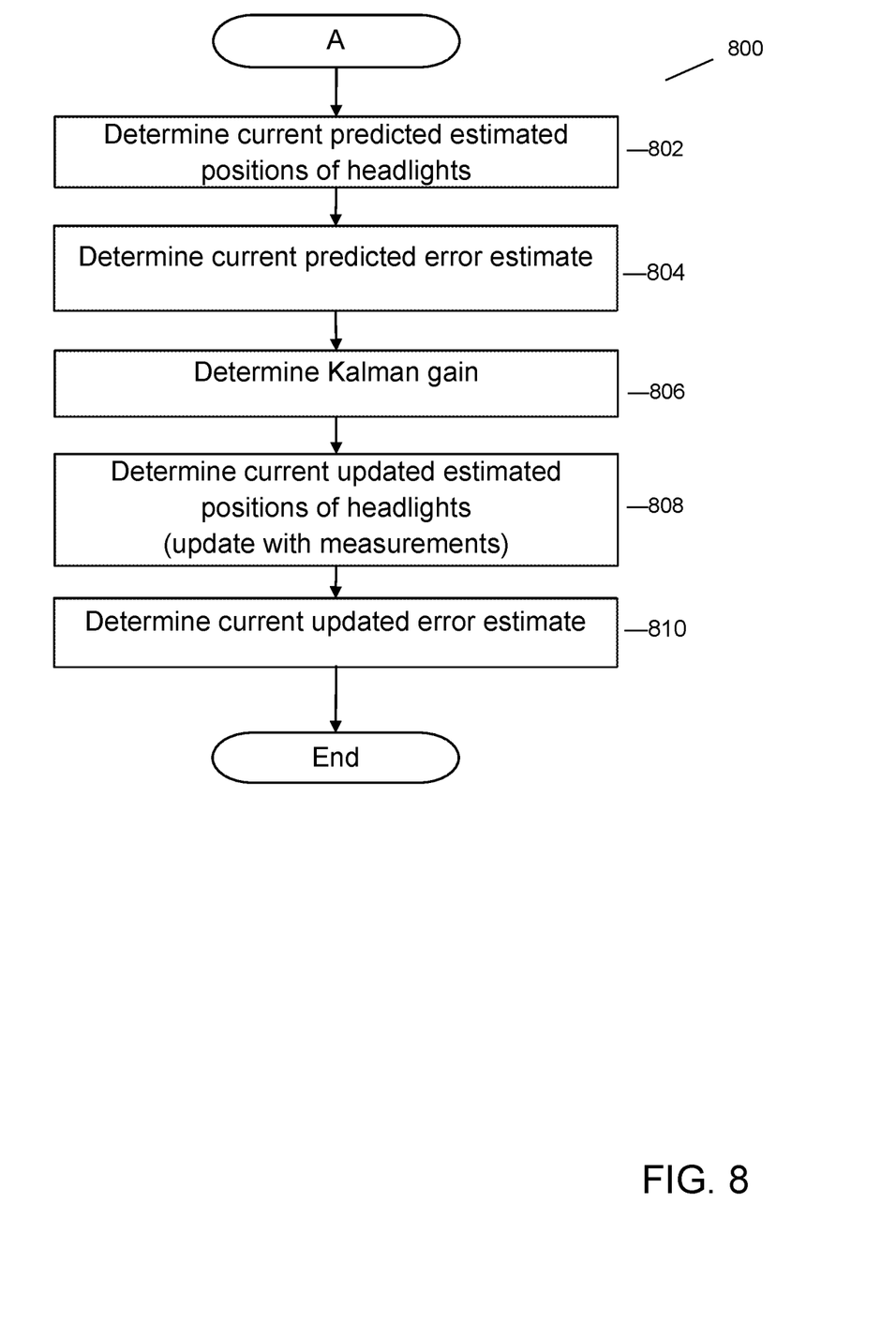
FIG. 8 is a flow chart of the Kalman filter method 800 to determine locations to put blots on the display screen 112 to block the headlights.

FIG. 8 is a flow chart of the Kalman filter method 800 to determine locations to put blots on the display screen 112 to block the headlights. FIG. 8 covers in detail step 610 of FIG. 6. The first step (802) is determining current predicted estimated positions and velocities using a state estimate predictor equation with a prior updated state estimate. Next, a current predicted error estimate is determined using an error estimate prediction equation with a prior updated error estimate and a predetermined process error (step 804). The Kalman gain is determined using the Kalman gain equation, based on a current predicted error estimate and a predetermined observation error (step 806). The current updated estimated positions and velocities are determined using the state estimate update equation with the current predicted estimated positions and velocities and with the current measured positions (step 808). A current updated error estimate is determined using the error estimate update equation with the current predicted error estimate (step 810).

The Kalman filter, which has been primed with values for "error in measurement" and "velocity of moving lights", outputs the "predicted positions of the headlights" in time interval ΔT. If first classifier (trained Model A) is unable to continuously track the set of one or more headlights, the processing logic uses the Kalman filter in a fixed time interval to predict the location of the headlights. This prevents any gaps in the placement of the blots 114, 124 on the transparent display screen 112 from one time interval to the next. After the predicted locations have been calculated, these values are stored as a time series. With the new predicted values, the new Kalman gain and new error in estimation are calculated for the next round). After these predicted coordinates are calculated, then the coordinates are scaled for the screen size of the transparent display screen 112 and converted into locations of the blots 114, 124 on the transparent display screen 112. The size and shape of the blots 114 and 124 are calculated as well. These locations are adjusted for the location of the driver's eyes 106, 126 relative to the transparent display screen 112 using the current setup information. Finally, the new predicted, scaled, and adjusted blot locations are pushed to the display screen driver 117 that drives the transparent display screen 112 and the blots 114, 124 are displayed accordingly. The video frame image processing method 600 then loops back to the start again.

What is claimed is:

1. A system for a vehicle for reducing glare experienced by a driver of the vehicle comprising:
   a camera mounted on the vehicle, facing forward, configured to transmit a stream of images;
   a display screen mounted on a windshield of the vehicle, the display screen divided into a plurality of pixels, each pixel individually controllable for at least two transparency states, including a high transparency state and a low transparency state, wherein each pixel in the high transparency state allows more light to pass through than in the low transparency state;
   a processor configured for performing the steps of:
      capturing a video frame image from the stream of images,
      detecting one or more headlights within the video frame image;
      determining current measured positions of the one or more headlights within the video frame image;
      determining locations of one or more blots on the display screen, based on the current measured positions of the one or more headlights within the video frame image and a current set of setup information, including setup locations of the one or more blots;
      sending commands to put the one or more blots on the display screen at the determined locations by setting pixels within the one or more blots to the low transparency state;
   controls configured for sending control signals to the processor for changing aspects of the one or more blots, including setup location;
   wherein determining the locations of the one or more blots on the display screen further comprises:

determining current updated estimated positions and velocities of the one or more headlights in the video frame image using a Kalman filter, based on prior updated estimated positions and velocities, updating with the current measured positions;

converting the current updated estimated positions of the one or more headlights in the video frame image to locations of one or more blots on the display screen; and adjusting locations of the one or more blots based on the current set of setup information;

wherein determining the current updated estimated positions of the one or more headlights in the video frame image using a Kalman filter further comprises:

determining current predicted estimated positions and velocities using a state estimate predictor equation with a prior updated state estimate;

determining a current predicted error estimate using an error estimate prediction equation with a prior updated error estimate and a predetermined process error;

determining Kalman gain using a Kalman gain equation, based on a current predicted error estimate and a predetermined observation error;

determining the current updated estimated positions and velocities using a state estimate update equation with the current predicted estimated positions and velocities and with the current measured positions; and determining a current updated error estimate using an error estimate update equation with the current predicted error estimate.

2. The system of claim 1 wherein determining the locations of the one or more blots on the display screen further comprises:

determining a location of a first blot of the one or more blots, the location of the first blot calculated to intersect a first line of sight between a first eye of the driver and the headlights.

3. The system of claim 2 wherein determining the locations of the one or more blots on the display screen further comprises:

determining a location of a second blot of the one or more blots, the location of the second blot calculated to intersect a second line of sight between a second eye of the driver and the headlights.

4. The system of claim 1 wherein detecting one or more headlights within the video frame image further comprises:

scanning the video frame image with a one or more Haar Cascade classifiers to determine the current measured positions of each of the one or more headlights within the video frame image.

5. A system for a vehicle for reducing glare experienced by a driver of the vehicle comprising:

a camera mounted on the vehicle, facing forward, configured to transmit a stream of images;

a display screen mounted on a windshield of the vehicle, the display screen divided into a plurality of pixels, each pixel individually controllable for at least two transparency states, including a high transparency state and a low transparency state, wherein each pixel in the high transparency state allows more light to pass through than in the low transparency state;

a processor configured for performing the steps of:
capturing a video frame image from the stream of images, detecting one or more headlights within the video frame image;

determining current measured positions of the one or more headlights within the video frame image;

determining locations of one or more blots on the display screen, based on the current measured positions of the one or more headlights within the video frame image and a current set of setup information, including setup locations of the one or more blots;

sending commands to put the one or more blots on the display screen at the determined locations by setting pixels within the one or more blots to the low transparency state;

controls configured for sending control signals to the processor for changing aspects of the one or more blots, including setup location;

wherein detecting one or more headlights within the video frame image further comprises:

scanning the video frame image with a first Haar Cascade classifier to filter out lights that are not headlights, determine coordinates within the video frame image of the one or more headlights;

extracting a subset image of the video frame image based on the coordinates of the one or more headlights; and scanning the subset image with a second Haar Cascade classifier to determine the current measured positions of each of the one or more headlights within the subset image.

6. The system of claim 5 wherein the processor is further configured for performing the steps of:

retrieving a previous set of setup information;

causing one or more blots to be put on the display screen in the setup locations in the previous set of setup information; and changing the setup locations of the one or more blots, based on control signals received from the controls.

7. A method for a system for reducing glare experienced by a driver of a vehicle, the system including a camera, a display screen, controls, and a processor, the camera mounted facing forward on the vehicle, the display screen mounted on a windshield of the vehicle, the display screen divided into a plurality of pixels, each pixel individually controllable for at least two transparency states, including a high transparency state and a low transparency state, wherein each pixel in the high transparency state allows more light to pass through than in the low transparency state, the system configured for performing method steps comprising:

capturing a video frame image from a stream of images from the camera;

detecting one or more headlights within the video frame image;

determining current measured positions of the one or more headlights within the video frame image;

determining one or more locations on the display screen to place one or more blots based on the current measured positions of the one or more headlights within the video frame image and a current set of setup information, including setup locations of the one or more blots;

sending commands to put the one or more blots on the display screen at the determined locations by setting pixels within the one or more blots to the low transparency state;

receiving control signals from the controls for changing aspects of the one or more blots, including setup location;

wherein determining the locations of the one or more blots on the display screen further comprises:
determining current updated estimated positions and velocities of the one or more headlights in the video frame image using a Kalman filter, based on prior updated estimated positions and velocities, updating with the current measured positions;
converting the current updated estimated positions of the one or more headlights in the video frame image to locations of one or more blots on the display screen; and
adjusting locations of the one or more blots based on the current set of setup information; and
wherein determining the current updated estimated positions of the one or more headlights in the video frame image using a Kalman filter further comprises:
determining current predicted estimated positions and velocities using a state estimate predictor equation with a prior updated state estimate;
determining a current predicted error estimate using an error estimate prediction equation with a prior updated error estimate and a predetermined process error;
determining Kalman gain using a Kalman gain equation, based on a current predicted error estimate and a predetermined observation error;
determining the current updated estimated positions and velocities using a state estimate update equation with the current predicted estimated positions and velocities and with the current measured positions; and
determining a current updated error estimate using an error estimate update equation with the current predicted error estimate.

8. The method of claim 7 wherein determining the locations of the one or more blots on the display screen further comprises:
determining a location of a first blot of the one or more blots, the location of the first blot calculated to intersect a first line of sight between a first eye of the driver and the headlights.

9. The method of claim 8 wherein determining the locations of the one or more blots on the display screen further comprises:
determining a location of a second blot of the one or more blots, the location of the second blot calculated to intersect a second line of sight between a second eye of the driver and the headlights.

10. The method of claim 7 wherein detecting one or more headlights within the video frame image further comprises:
scanning the video frame image with a one or more Haar Cascade classifiers to determine the current measured positions of each of the one or more headlights within the video frame image.

11. A method for a system for reducing glare experienced by a driver of a vehicle, the system including a camera, a display screen, controls, and a processor, the camera mounted facing forward on the vehicle, the display screen mounted on a windshield of the vehicle, the display screen divided into a plurality of pixels, each pixel individually controllable for at least two transparency states, including a high transparency state and a low transparency state, wherein each pixel in the high transparency state allows more light to pass through than in the low transparency state, the system configured for performing method steps comprising:
capturing a video frame image from a stream of images from the camera;
detecting one or more headlights within the video frame image;
determining current measured positions of the one or more headlights within the video frame image;
determining one or more locations on the display screen to place one or more blots based on the current measured positions of the one or more headlights within the video frame image and a current set of setup information, including setup locations of the one or more blots;
sending commands to put the one or more blots on the display screen at the determined locations by setting pixels within the one or more blots to the low transparency state;
receiving control signals from the controls for changing aspects of the one or more blots, including setup location; and
wherein detecting one or more headlights within the video frame image further comprises:
scanning the video frame image with a first Haar Cascade classifier to filter out lights that are not headlights, determine coordinates within the video frame image of the one or more headlights;
extracting a subset image of the video frame image based on the coordinates of the one or more headlights; and
scanning the subset image with a second Haar Cascade classifier to determine the current measured positions of each of the one or more headlights within the subset image.

12. The method of claim 11 wherein the processor is further configured for performing the steps of:
retrieving a previous set of setup information;
causing one or more blots to be put on the display screen in the setup locations in the previous set of setup information; and
changing the setup locations of the one or more blots, based on control signals received from the controls.

* * * * *